(12) United States Patent
Mirkin

(10) Patent No.: US 9,261,603 B2
(45) Date of Patent: Feb. 16, 2016

(54) NAVIGATION SYSTEM WITH CONDITIONAL BASED APPLICATION SHARING MECHANISM AND METHOD OF OPERATION THEREOF

(75) Inventor: Eugene A. Mirkin, San Francisco, CA (US)

(73) Assignee: TELENAV, INC., Sunnyvale, CA (US)

( * ) Notice: Subject to any disclaimer, the term of this patent is extended or adjusted under 35 U.S.C. 154(b) by 365 days.

(21) Appl. No.: 13/083,910

(22) Filed: Apr. 11, 2011

(65) Prior Publication Data

US 2012/0260268 A1 Oct. 11, 2012

(51) Int. Cl.
 *G06F 9/54* (2006.01)
 *G01S 19/49* (2010.01)
 *G01C 21/26* (2006.01)
 *G01S 5/00* (2006.01)
 *G01S 5/02* (2010.01)
 *G01S 19/35* (2010.01)

(52) U.S. Cl.
 CPC ............... *G01S 19/49* (2013.01); *G01C 21/26* (2013.01); *G01S 5/0072* (2013.01); *G01S 5/0263* (2013.01); *G01S 19/35* (2013.01)

(58) Field of Classification Search
 None
 See application file for complete search history.

(56) References Cited

U.S. PATENT DOCUMENTS

| | | | |
|---|---|---|---|
| 6,748,321 B2 | 6/2004 | Watanabe et al. | |
| 6,816,782 B1 | 11/2004 | Walters et al. | |
| 7,595,725 B1 * | 9/2009 | Joseph et al. | 340/539.2 |
| 7,663,502 B2 | 2/2010 | Breed | |
| 2005/0091571 A1 * | 4/2005 | Leichtling | 715/500 |
| 2005/0197745 A1 * | 9/2005 | Davis et al. | 701/1 |
| 2007/0004451 A1 * | 1/2007 | Anderson | 455/556.1 |
| 2008/0122847 A1 * | 5/2008 | Takano et al. | 345/428 |
| 2009/0055087 A1 * | 2/2009 | Beacher | 701/200 |
| 2009/0303926 A1 | 12/2009 | Den Hartog et al. | |
| 2010/0195503 A1 * | 8/2010 | Raleigh | 370/235 |
| 2010/0257539 A1 | 10/2010 | Narayanan et al. | |
| 2012/0072204 A1 * | 3/2012 | Nasri et al. | 704/9 |
| 2012/0089684 A1 * | 4/2012 | Angus et al. | 709/206 |

OTHER PUBLICATIONS

Serra et al., "Inertial Navigation Systems for User—Centric Indoor Applications", pp. 1-5, Published in: Italy.

* cited by examiner

*Primary Examiner* — Umut Onat
(74) *Attorney, Agent, or Firm* — IP Investment Law Group

(57) ABSTRACT

A method of operation of a navigation system includes: determining a service type of a first application for interacting with a first pairing device; determining a second application for interacting with a second pairing device in which the second application is also of the service type; selecting the second application with the second application meeting or exceeding a selection condition, otherwise the first application is selected; and generating an execution result for executing the second application for displaying on the first pairing device.

28 Claims, 7 Drawing Sheets

NAVIGATION SYSTEM WITH CONDITIONAL BASED APPLICATION SHARING MECHANISM AND METHOD OF OPERATION THEREOF

TECHNICAL FIELD

The present invention relates generally to a navigation system, and more particularly to a system for conditional based application sharing mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world". One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, application sharing without considering the criteria for selecting which application to select has become a paramount concern for the consumer. Selecting the application without the criteria not most optimal for the user by the navigation system decreases the benefit of using the tool.

Thus, a need still remains for a navigation system with conditional based application sharing mechanism to select an application best suited for the circumstance. In view of the ever-increasing commercial competitive pressures, along with growing consumer expectations and the diminishing opportunities for meaningful product differentiation in the marketplace, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: determining a service type of a first application for interacting with a first pairing device; determining a second application for interacting with a second pairing device in which the second application is also of the service type; selecting the second application with the second application meeting or exceeding a selection condition, otherwise the first application is selected; and generating an execution result for executing the second application for displaying on the first pairing device.

The present invention provides a navigation system, including: an application one detector module for determining a service type of a first application for interacting with a first pairing device; an application two detector module, coupled to the application one detector module, for determining a second application for interacting with a second pairing device in which the second application is also of the service type; an application selector module, coupled to the application two detector module, for selecting the second application with the second application meeting or exceeding a selection condition, otherwise the first application is selected; and a result access module, coupled to the application selector module, for generating an execution result for executing the second application for displaying on the first pairing device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
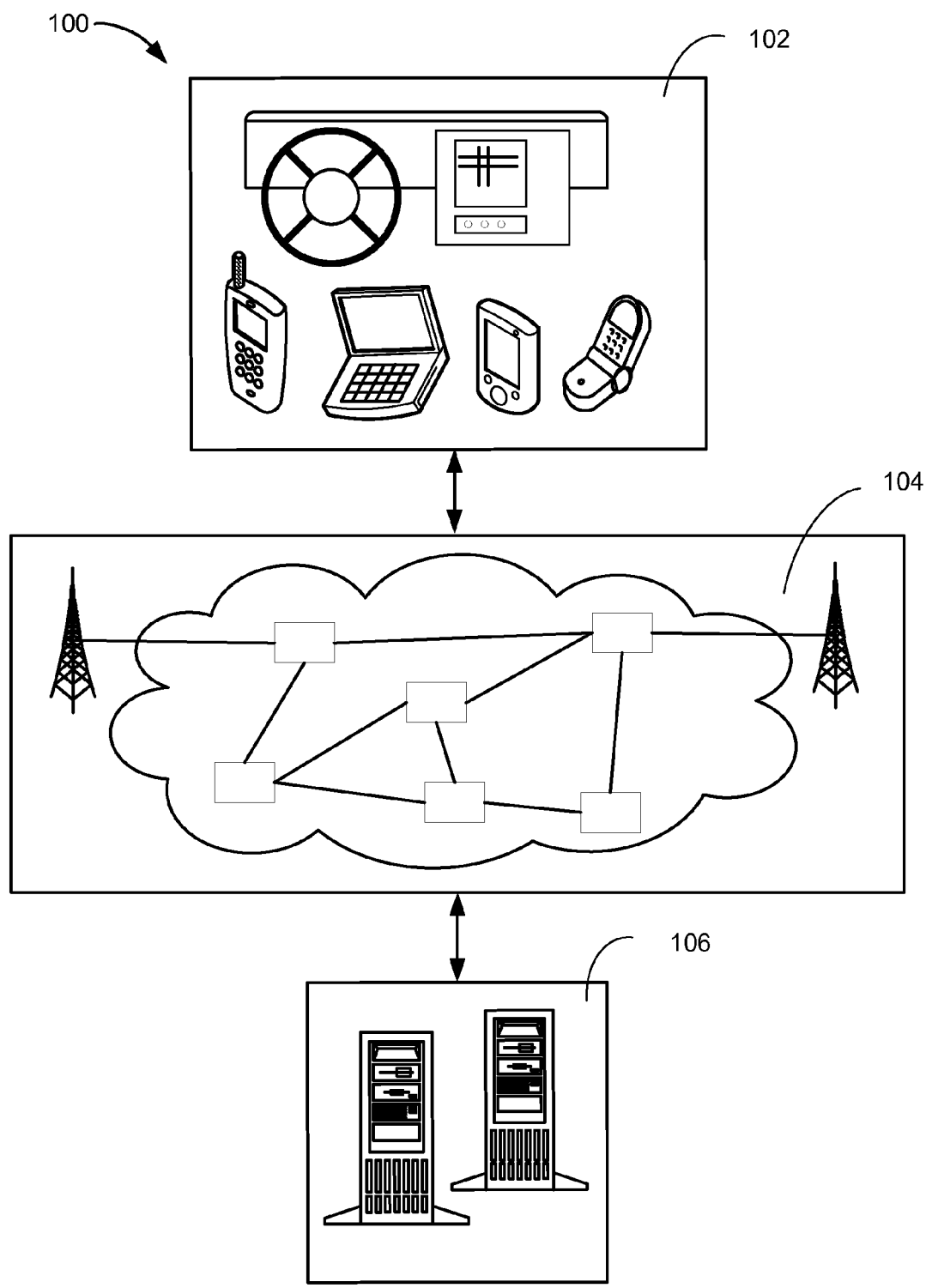
FIG. 1 is a navigation system with conditional based application sharing mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing Figures. Similarly, although the views in the drawings for ease of description generally show similar orientations, this depiction in the Figures is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with conditional based application sharing mechanism in an embodiment of the present invention. The navigation system 100 includes a first device 102, such as a client or a server, connected to a second device 106, such as a client or a server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth®, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
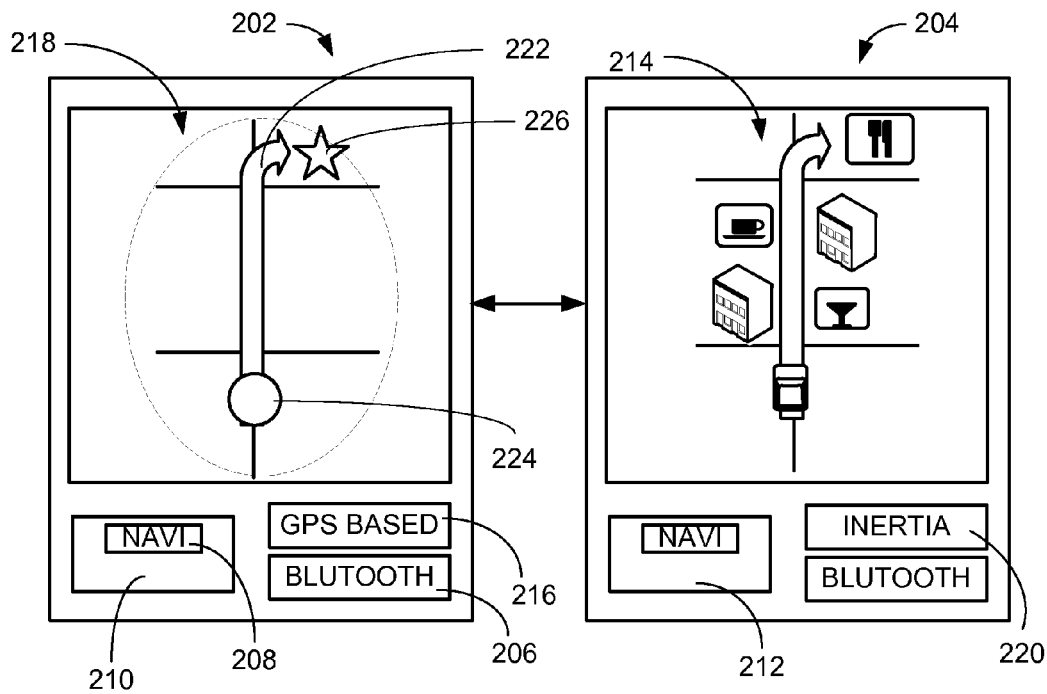
FIG. 2 is an example of a first pairing device and a second pairing device paired.

Referring now to FIG. 2, therein is shown an example of a first pairing device 202 and a second pairing device 204 paired. The first pairing device 202 is defined as a device as defined by first device 102 of FIG. 1 or the second device 106 of FIG. 1. The second pairing device 204 is defined as a device as defined by first device 102 or the second device 106.

For a specific example, the first pairing device 202 can be a smartphone. For another example, the second pairing device 204 can be an in-vehicle GPS navigation system.

A pairing criteria 206 is defined as the condition, criteria, threshold, or a combination thereof required for the first pairing device 202 and the second pairing device 204 to be paired. For a further definition, being paired is defined as a relationship between the first pairing device 202 and the second pairing device 204 where the two devices are connected via the communication path 104 of FIG. 1 or some portion thereof.

For example, the pairing criteria 206 can be that the first pairing device 202 and the second pairing device 204 both have Bluetooth® connectivity. For another example, the pairing criteria 206 can be that the first pairing device 202 and the second pairing device 204 are within a predefined physical distance from each other. For a different example, the pairing criteria 206 can be set as an availability of a service type 208 in the first pairing device 202, the second pairing device 204, or a combination thereof.

The service type 208 is defined as the type of application available on the first pairing device 202, the second pairing device 204, or a combination thereof. For further definition, an application is defined as function running on the first pairing device 202, the second pairing device 204, or a combination thereof. More specifically, the service type 208 can be of a same type of application or of a different type of application that is compatible.

For example, computer software with the service type 208 of a navigation program can execute a function to generate a travel route 222. For another example, the service type 208 can be a media player that can play audio files, video files, or a combination thereof.

For further examples, the second pairing device 204 or the in-vehicle GPS navigation system can include the application with the service type 208 of a speedometer, a fuel gauge, or a combination thereof. The first pairing device 202 or the smartphone, as an example, can include the application with the service type 208 that permits a touch sensitive input, a voice input, or a combination thereof. The two applications can be of different types, but are compatible, because the user, the navigation system 100, or a combination thereof can access the fuel information with a voice input.

The travel route 222 is defined as the path the navigation system 100 travels along to reach a target destination 226. The target destination 226 is defined as the final stopping where the navigation system 100 ends its travel.

The first pairing device 202 can run a first application 210. The first application 210 is defined as an application running on the first pairing device 202. For example, the first application 210 can represent an inertia based navigation program.

The second pairing device 204 can run a second application 212. The second application 212 is defined as an application running on the second pairing device 204. For example, the second application 212 can represent a GPS based navigation program.

As an example, the first pairing device 202 and the second pairing device 204 can run the same application, complementary application, the same application but complementary components, or a combination thereof. For a specific example, the first pairing device 202 and the second pairing device 204 can both run the first application 210 concurrently. More specifically, the first pairing device 202 and the second pairing device 204 can run the first application 210 representing a GPS based navigation program.

For another example, the first pairing device 202 and the second pairing device 204 can run complementary application. More specifically, the first pairing device 202 can run the first application 210 representing a speedometer. The second pairing device 204 can run the second application 212 representing a GPS based navigation program. The first application 210 and the second application 212 are different type of the service type 208 but are complementary. For example, the first application 210 and the second application 212 can complement each other by providing the navigation system 100 with a current physical location 224 of the navigation system 100 in the geographic region and the speed, which the navigation system 100 is traveling along the travel route 222.

For another example, the first pairing device 202 and the second pairing device 204 can run the same function but complementary components. More specifically, the first pairing device 202 and the second pairing device 204 can run the first application 210 representing a GPS based navigation program. The first pairing device 202 can execute the function for generating the travel route 222 of the first application 210. The second pairing device 204 can execute the function of the first application 210 that generates the map of the geographic region where the navigation 100 is traveling.

The first pairing device 202 can access an execution result 214 of the second pairing device 204 executing the second application 212 based on a selection condition 216. In contrast, the second pairing device 204 can access the execution result 214 of the first pairing device 202 executing the first application 210 based on the selection condition 216.

The execution result 214 is defined as the result of executing the first application 210, the result of executing the second application 212, or a combination thereof. For example, the execution result 214 can represent the travel route 222 from the current physical location 224 of the navigation system 100 to the target destination 226. The current physical location 224 is the present physical location of the navigation system 100 along the travel route 222.

The selection condition 216 is defined as the condition, criteria, threshold, or a combination thereof required to determine whether to access the execution result 214 generated by the first application 210, the second application 212, or a combination thereof. For example, the selection condition 216 can be the granularity of the execution result 214. The first application 210 can represent an inertia based navigation program. The second application 212 can represent a GPS based navigation program.

As illustrated in FIG. 2, the second application 212 can generate the execution result 214 that represents navigation information that includes the buildings and restaurants along the travel route 222 to the target destination 226. In contrast, the first application 210 can generate the execution result 214 that represents navigation information that only includes the travel route 222 and the target destination 226. Under the selection condition 216, the navigation system 100 can select the second application 212, because the execution result 214 of the second application 212 is more granular than the first application 210.

For another example, the selection condition 216 can represent the availability of the service type 208. For a specific example, the first pairing device 202 may not have the service type 208 representing a speedometer. The second application 212 can represent a speedometer. Based on the selection condition 216 as the availability of the service type 208 for speedometer, the first pairing device 202 can access the execution result 214 generated by the second application 212.

A default condition 220 is defined as the selection condition 216 set as a default in the navigation system 100. For example, for the navigation system 100 that runs a GPS based navigation program can have the default condition 220 of an inertia based navigation program. More specifically, when the navigation system 100 travels in a geographic region where there is no reception from the GPS satellite or no navigation service, the navigation system 100 can attempt to access a device that runs an inertia based navigation program as a default. Some examples of navigation services include cellular triangulation, WiFi signals without GPS satellite, or a combination thereof.

The shortcoming 218 is defined as a weakness in the application that results in an incomplete solution. For example, the first application 210 can represent an inertia based navigation program. The execution result 214 of the first application 210 can be the travel route 222 to the target destination 226 without any granularity as to the details of the geographic area where the navigation system 100 is traveling, because the inertia based navigation program may not be able to locate the current physical location 224 of the navigation system 100 within a geographic region. The shortcoming 218 of the first application 210 can be the inability to provide the navigation information that includes the current physical location 224.

In contrast, the second application 212 can represent a GPS based navigation program. The execution result 214 of the second application 212 can be the travel route 222 to the target destination 226 with granularity as to the details of the geographic area where the navigation system 100 is traveling, because a communication with the GPS satellite aided the navigation system 100 to pin point the current physical location 224 within the geographic region. The shortcoming 218 of the second application 212 can be the inability to provide the navigation information if the navigation system 100 is not in communication with the GPS satellite.

Figure 3:
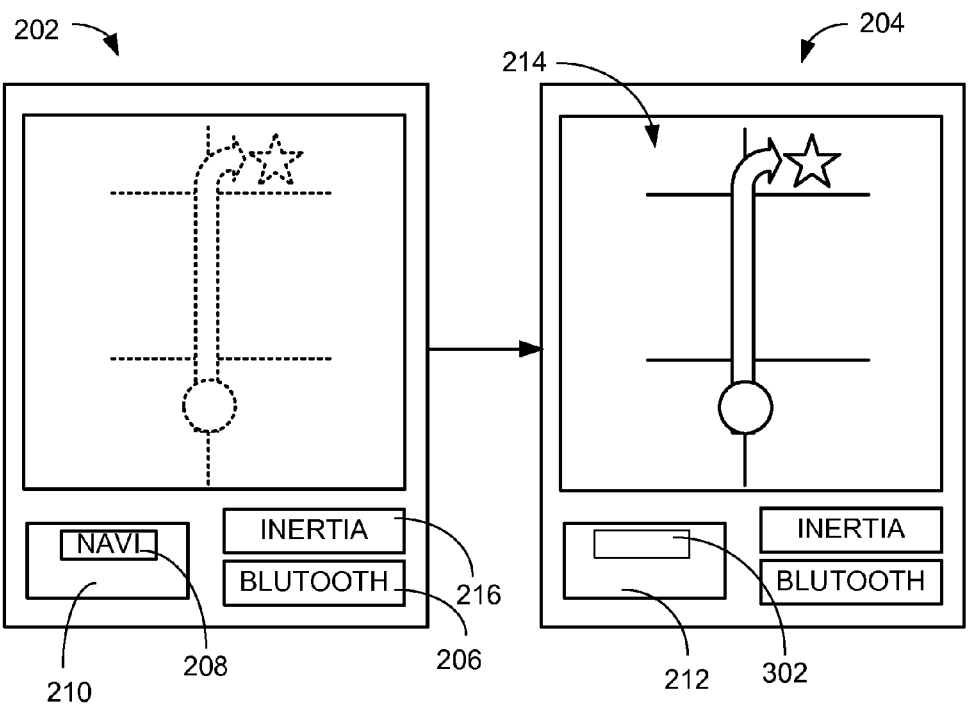
FIG. 3 is an example of the second pairing device generating the execution result generated by the first application of the first pairing device.

Referring now to FIG. 3, therein is shown an example of the second pairing device 204 generating the execution result 214 generated by the first application 210 of the first pairing device 202. For a more specific example, the first pairing device 202 and the second pairing device 204 can be paired by the pairing criteria 206 representing Bluetooth® connectivity. The second application 212 can represent a GPS based navigation program.

For example, the selection condition 216 can represent an availability of an inertia based navigation program, because the navigation system 100 is running the second application 212 representing a GPS based navigation program. Furthermore, the navigation system 100 is traveling in a geographic region where there is no reception from the navigation service. Furthermore, the non-availability of the service type 208 representing a navigation program can be represented as an unavailable application 302.

The unavailable application 302 is defined as a status or type for representing the inaccessibility of a particular type of the service type 208. For example, the service type 208 representing a navigation program for the second application 212 can be the unavailable application 302 as illustrated in FIG. 3.

As a result, the second pairing device 204 can access the execution result 214 generated by the first application 210 of the first pairing device 202, since the navigation program in the second pairing device 204 is the unavailable application 302. For a specific example, the second pairing device 204 can display the travel route 222 where the navigation system 100 is traveling along the travel route 222 towards the target destination 226.

The first pairing device 202 can also display or not display the execution result 214 generated by the first application 210 after the second pairing device 204 accessed the execution result 214. The dotted lines can represent the execution result 214 not displayed on the first pairing device 202, but accessed and displayed by the second pairing device 204.

Figure 4:
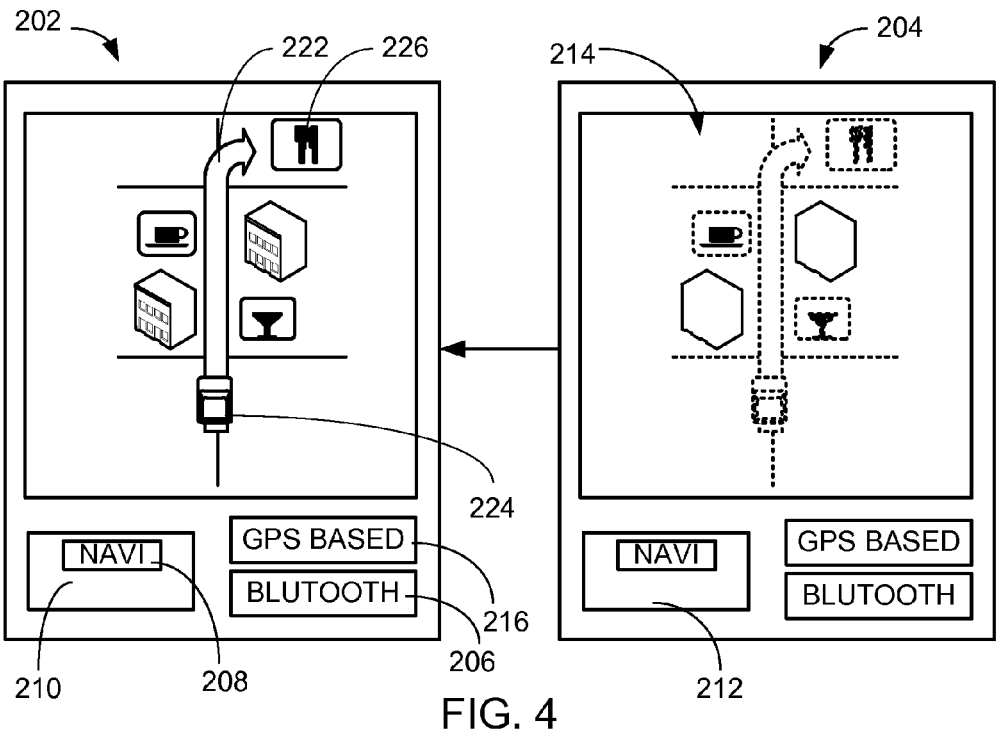
FIG. 4 is an example of the first pairing device generating the execution result generated by the second application of the second pairing device.

Referring now to FIG. 4, therein is shown an example of the first pairing device 202 generating the execution result 214 generated by the second application 212 of the second pairing device 204. For a more specific example, the first pairing device 202 and the second pairing device 204 can be paired by the pairing criteria 206 representing Bluetooth® connectivity. The first application 210 and the second application 212 can have the service type 208 representing a navigation program.

As illustrated in FIG. 4, the selection condition 216 can represent an availability of the GPS based navigation program, because the navigation system 100 may require the current physical location 224 of the first pairing device 202 within the geographic region at the beginning of the travel. For example, the navigation program installed in the first pairing device 202 can be inertia based navigation program that cannot locate the current physical location 224 of the first pairing device 202. Subsequently, the first pairing device 202, such as a smartphone, can access the execution result 214 generated by the second application 212, an in-vehicle navigation system, after the user carrying the smartphone leaves the vehicle. Furthermore, the navigation system 100 can run the second application 212. For a specific example, the first pairing device 202 can display the travel route 222 from the current physical location 224 of the first pairing device 202 to the target destination 226 generated by the second application 212.

The second pairing device 204 can also display or not display the execution result 214 generated by the second application 212 after the first pairing device 202 accessed the execution result 214. The dotted lines can represent the execution result 214 not displayed on the second pairing device 204, but accessed and displayed by the first pairing device 202.

Figure 5:
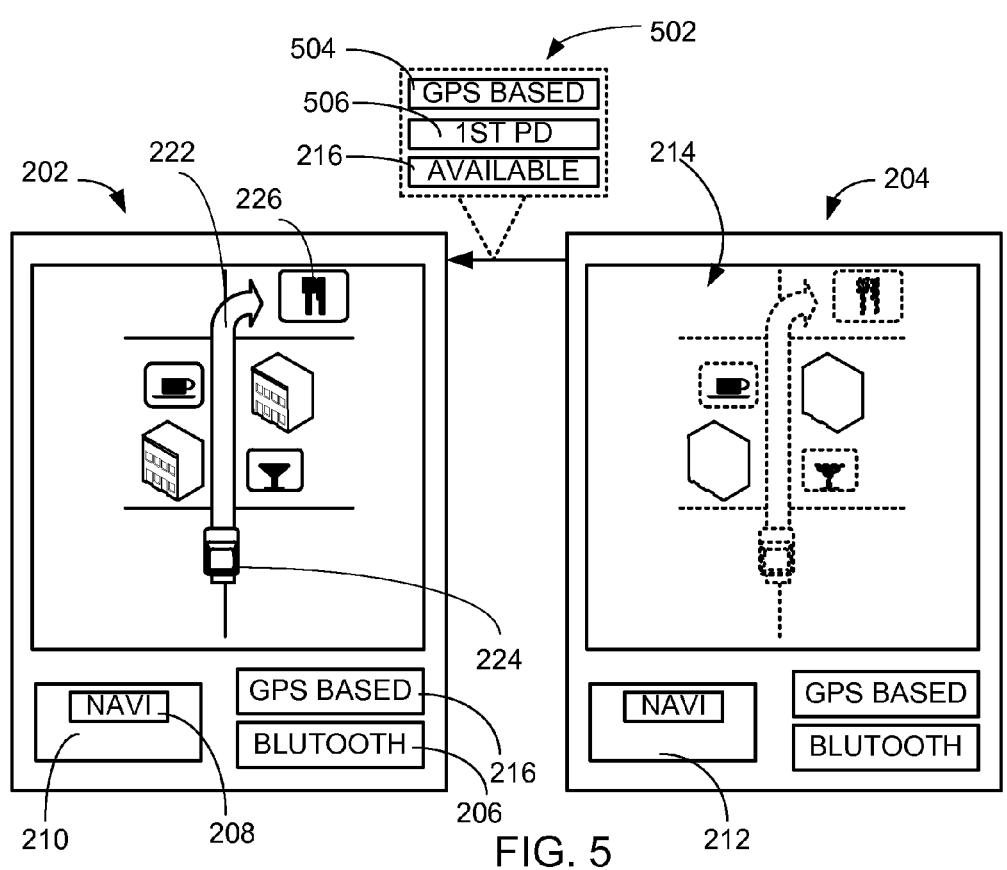
FIG. 5 is an example of the second pairing device entering a command input into the first pairing device.

Referring now to FIG. 5, therein is shown an example of the second pairing device 204 entering a command input 502 into the first pairing device 202. The command input 502 is defined as an entry made by the user, the navigation system 100, or a combination thereof that influences, dictates, or a combination thereof the applications running on the first pairing device 202, the second pairing device 204, or a combination thereof. The command input 502 can be made by manual typing, verbal commands, selection from a list, or a combination thereof.

The command input 502 can include the selection condition 216, a service selection 504, a device selection 506, or a combination thereof for inputting into the first pairing device 202. The user of the navigation system 100 can also enter the service selection 504, the selection condition 216, the device selection 506, or a combination thereof in the second pairing device 204.

The service selection 504 is defined as the selection made by the user, the navigation system 100, or a combination thereof regarding the desired application the device should access. For example, if the user chooses the service selection 504 to be the GPS based navigation program, the first pairing device 202 can access the execution result 214 generated by the second application 212 of FIG. 2, because the second application 212 can be the service type 208 of FIG. 2 representing a GPS based navigation program.

The device selection 506 is defined as a choice made by the user, the navigation system 100, or a combination thereof as to which device accesses the execution result 214. For example, if the second pairing device 204 can choose the first pairing device 202. Subsequently, the first pairing device 202 can access the execution result 214 generated by the second pairing device 204 for displaying on the first pairing device 202. For a specific example, the first pairing device 202 can display the travel route 222 to the target destination 226.

Figure 6:
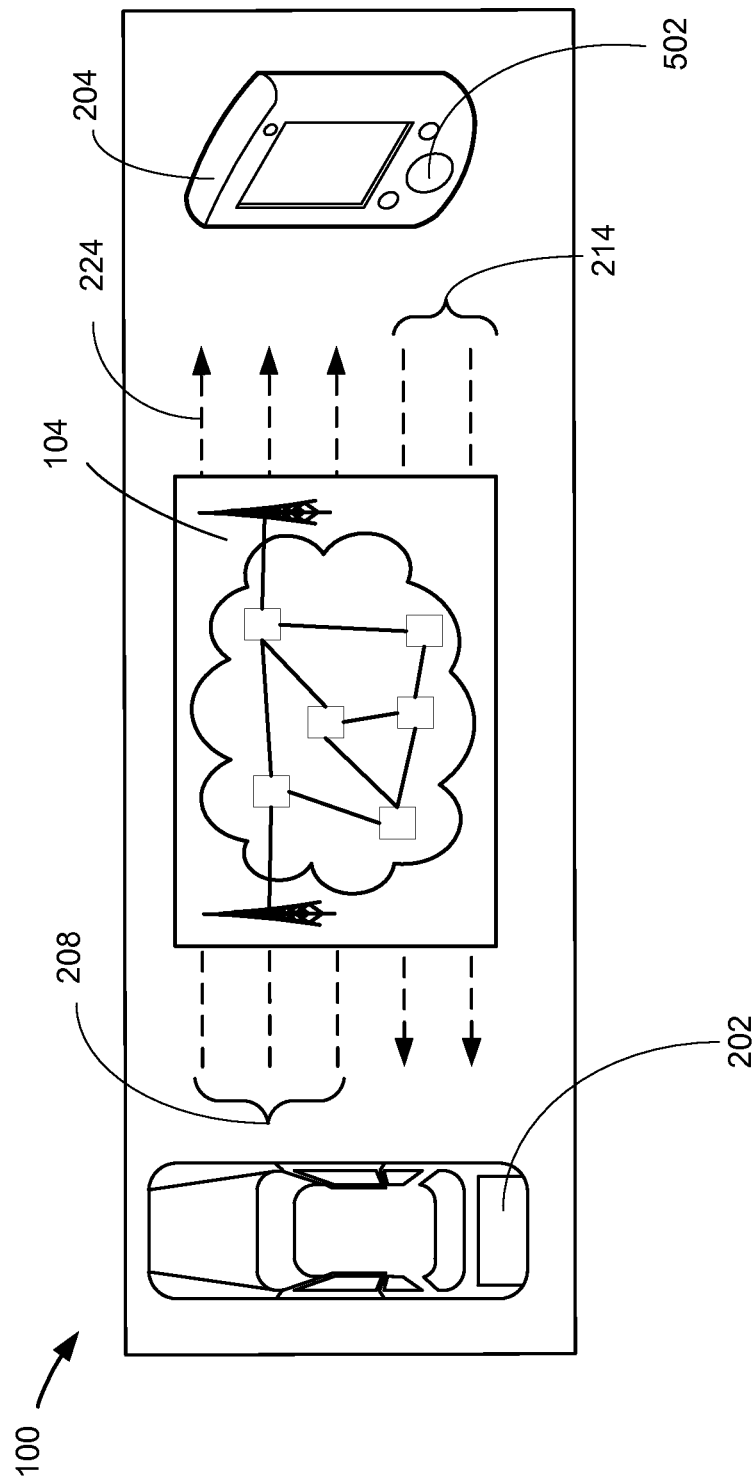
FIG. 6 is an example of pairing between the first pairing device that is integrated with a vehicle and the second pairing device representing a mobile device.

Referring now to FIG. 6, therein is shown an example of pairing between the first pairing device 202 that is integrated with a vehicle and the second pairing device 204 representing a mobile device. For example, the first pairing device 202 can run the service type 208 of FIG. 2 representing an in-vehicle navigation system. The second pairing device 204 can represent the smartphone with the service type 208 representing a digital audio player and navigation program.

The first pairing device 202 and the second pairing device 204 can be paired by communicating via the communication path 104 representing Bluetooth® connectivity. The selection condition 216 of FIG. 2 can be the granularity of the execution result 214.

Although the second pairing device 204 can generate navigation information, because the navigation information generated by the first pairing device 202 is more granular, the second pairing device 204 can access and receive the execution result 214 representing the navigation information generated by the first pairing device 202. The second pairing device 204 can access the execution result 214 from the first pairing device 202 via Bluetooth® connectivity. The execution result 214 can include the current physical location 224 of the navigation system 100, the current traveling speed of the vehicle, the current fuel level of the vehicle, or a combination thereof.

The second pairing device 204 can stream audio by sending the execution result 214 representing an audio music to the first pairing device 202 via Bluetooth® connectivity. The selection condition 216 can represent an availability of a noise control capability on the speaker. For a specific example, the first pairing device 202 can be equipped with active noise reduction capability. The second pairing device 204 may not be equipped with active noise reduction capability. If the first pairing device 202 and the second pairing device 204 are paired, the second pairing device 204 can send the execution result 214 to stream the audio file and play the music on the first pairing device 202. The first pairing device 202 can play the audio file with less noise due to its active noise reduction capability.

The second pairing device 204 can receive the command input 502 even if the second pairing device 204 is paired to the first pairing device 202. The second pairing device 204 can receive the command input 502 in the form of manual inputs, oral commands, or a combination thereof.

Figure 7:
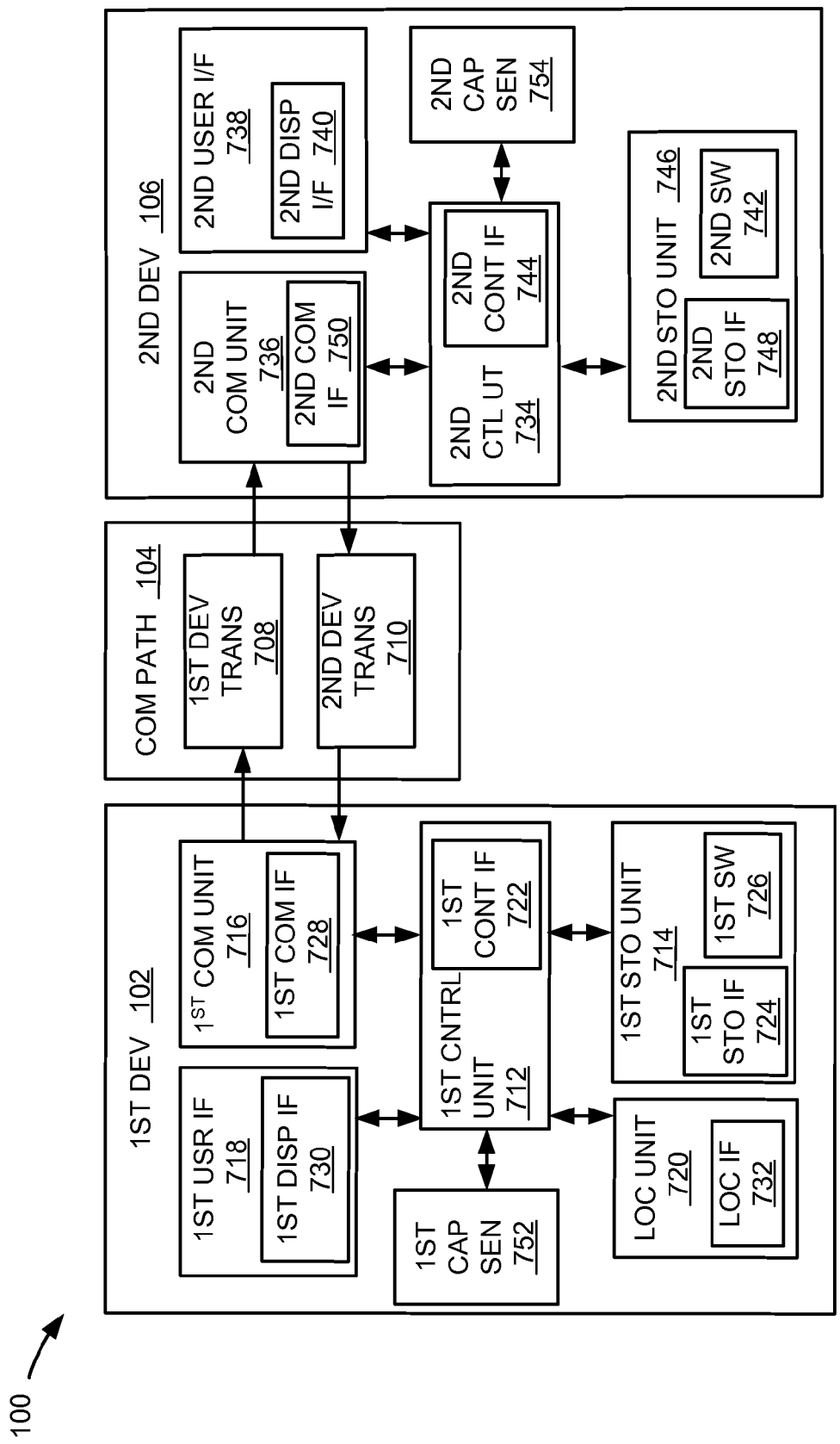
FIG. 7 is an exemplary block diagram of the navigation system.

Referring now to FIG. 7, therein is shown an exemplary block diagram of the navigation system 100. The navigation system 100 can include the first device 102, the communication path 104, and the second device 106. The first device 102 can send information in a first device transmission 708 over the communication path 104 to the second device 106. The second device 106 can send information in a second device transmission 710 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 712, a first storage unit 714, a first communication unit 716, a first user interface 718, and a location unit 720. The first control unit 712 can include a first control interface 722. The first control unit 712 can execute a first software 726 to provide the intelligence of the navigation system 100. The first control unit 712 can be implemented in a number of different manners. For example, the first control unit 712 can be a processor, an embedded processor, a microprocessor, a hardware control logic, a hardware finite state machine (FSM), a digital signal processor (DSP), or a combination thereof. The first control interface 722 can be used for communication between the first control unit 712 and other functional units in the first device 102. The first control interface 722 can also be used for communication that is external to the first device 102.

The first control interface 722 can receive information from the other functional units or from external sources, or can transmit information to the other functional units or to external destinations. The external sources and the external destinations refer to sources and destinations external to the first device 102.

The first control interface 722 can be implemented in different ways and can include different implementations depending on which functional units or external units are being interfaced with the first control interface 722. For example, the first control interface 722 can be implemented with a pressure sensor, an inertial sensor, a microelectromechanical system (MEMS), optical circuitry, waveguides, wireless circuitry, wireline circuitry, or a combination thereof.

The location unit 720 can access location information, current heading, and current speed of the first device 102, as examples. The location unit 720 can be implemented in many ways. For example, the location unit 720 can function as at least a part of a global positioning system (GPS), an inertial navigation system, a cellular-tower location system, a pressure location system, or any combination thereof.

The location unit 720 can include a location interface 732. The location interface 732 can be used for communication between the location unit 720 and other functional units in the first device 102. The location interface 732 can also be used for communication that is external to the first device 102.

The location interface 732 can receive information from the other functional units or from external sources, or can transmit information to the other functional units or to external destinations. The external sources and the external destinations refer to sources and destinations external to the first device 102.

The location interface 732 can include different implementations depending on which functional units or external units are being interfaced with the location unit 720. The location interface 732 can be implemented with technologies and techniques similar to the implementation of the first control interface 722.

The first storage unit 714 can store the first software 726. The first storage unit 714 can also store the relevant information, such as advertisements, points of interest (POI), navigation routing entries, or any combination thereof.

The first storage unit 714 can be a volatile memory, a nonvolatile memory, an internal memory, an external memory, or a combination thereof. For example, the first storage unit 714 can be a nonvolatile storage such as non-volatile random access memory (NVRAM), Flash memory, disk storage, or a volatile storage such as static random access memory (SRAM).

The first storage unit 714 can include a first storage interface 724. The first storage interface 724 can be used for communication between the location unit 720 and other functional units in the first device 102. The first storage interface 724 can also be used for communication that is external to the first device 102.

The first storage interface 724 can receive information from the other functional units or from external sources, or can transmit information to the other functional units or to external destinations. The external sources and the external destinations refer to sources and destinations external to the first device 102.

The first storage interface 724 can include different implementations depending on which functional units or external units are being interfaced with the first storage unit 714. The first storage interface 724 can be implemented with technologies and techniques similar to the implementation of the first control interface 722.

The first communication unit 716 can enable external communication to and from the first device 102. For example, the first communication unit 716 can permit the first device 102 to communicate with the second device 106 of FIG. 1, an attachment, such as a peripheral device or a computer desktop, and the communication path 104.

The first communication unit 716 can also function as a communication hub allowing the first device 102 to function as part of the communication path 104 and not limited to be an end point or terminal unit to the communication path 104. The first communication unit 716 can include active and passive components, such as microelectronics or an antenna, for interaction with the communication path 104.

The first communication unit 716 can include a first communication interface 728. The first communication interface 728 can be used for communication between the first communication unit 716 and other functional units in the first device 102. The first communication interface 728 can receive information from the other functional units or can transmit information to the other functional units.

The first communication interface 728 can include different implementations depending on which functional units are being interfaced with the first communication unit 716. The first communication interface 728 can be implemented with technologies and techniques similar to the implementation of the first control interface 722.

The first user interface 718 allows a user (not shown) to interface and interact with the first device 102. The first user interface 718 can include an input device and an output device. Examples of the input device of the first user interface 718 can include a keypad, a touchpad, soft-keys, a keyboard, a microphone, or any combination thereof to provide data and communication inputs.

The first user interface 718 can include a first display interface 730. The first display interface 730 can include a display, a projector, a video screen, a speaker, or any combination thereof.

The first control unit 712 can operate the first user interface 718 to display information generated by the navigation system 100. The first control unit 712 can also execute the first software 726 for the other functions of the navigation system 100, including receiving location information from the location unit 720. The first control unit 712 can further execute the first software 726 for interaction with the communication path 104 via the first communication unit 716.

The second device 106 can be optimized for implementing the present invention in a multiple device embodiment with the first device 102. The second device 106 can provide the additional or higher performance processing power compared to the first device 102. The second device 106 can include a second control unit 734, a second communication unit 736, and a second user interface 738.

The second user interface 738 allows a user (not shown) to interface and interact with the second device 106. The second user interface 738 can include an input device and an output device. Examples of the input device of the second user interface 738 can include a keypad, a touchpad, soft-keys, a keyboard, a microphone, or any combination thereof to provide data and communication inputs. Examples of the output device of the second user interface 738 can include a second display interface 740. The second display interface 740 can include a display, a projector, a video screen, a speaker, or any combination thereof.

The second control unit 734 can execute a second software 742 to provide the intelligence of the second device 106 of the navigation system 100. The second software 742 can operate in conjunction with the first software 726. The second control unit 734 can provide additional performance compared to the first control unit 712.

The second control unit 734 can operate the second user interface 738 to display information. The second control unit 734 can also execute the second software 742 for the other functions of the navigation system 100, including operating the second communication unit 736 to communicate with the first device 102 over the communication path 104.

The second control unit 734 can be implemented in a number of different manners. For example, the second control unit 734 can be a processor, an embedded processor, a microprocessor, a hardware control logic, a hardware finite state machine (FSM), a digital signal processor (DSP), or a combination thereof.

The second control unit 734 can include a second controller interface 744. The second controller interface 744 can be used for communication between the second control unit 734 and other functional units in the second device 106. The second controller interface 744 can also be used for communication that is external to the second device 106.

The second controller interface 744 can receive information from the other functional units or from external sources, or can transmit information to the other functional units or to external destinations. The external sources and the external destinations refer to sources and destinations external to the second device 106.

The second controller interface 744 can be implemented in different ways and can include different implementations depending on which functional units or external units are being interfaced with the second controller interface 744. For example, the second controller interface 744 can be implemented with a pressure sensor, an inertial sensor, a microelectromechanical system (MEMS), optical circuitry, waveguides, wireless circuitry, wireline circuitry, or a combination thereof.

A second storage unit 746 can store the second software 742. The second storage unit 746 can also store the relevant information, such as advertisements, points of interest (POI), navigation routing entries, or any combination thereof. The second storage unit 746 can be sized to provide the additional storage capacity to supplement the first storage unit 714.

For illustrative purposes, the second storage unit 746 is shown as a single element, although it is understood that the second storage unit 746 can be a distribution of storage elements. Also for illustrative purposes, the navigation system 100 is shown with the second storage unit 746 as a single hierarchy storage system, although it is understood that the navigation system 100 can have the second storage unit 746 in a different configuration. For example, the second storage unit 746 can be formed with different storage technologies forming a memory hierarchal system including different levels of caching, main memory, rotating media, or off-line storage.

The second storage unit 746 can be a volatile memory, a nonvolatile memory, an internal memory, an external memory, or a combination thereof. For example, the second storage unit 746 can be a nonvolatile storage such as nonvolatile random access memory (NVRAM), Flash memory, disk storage, or a volatile storage such as static random access memory (SRAM).

The second storage unit 746 can include a second storage interface 748. The second storage interface 748 can be used for communication between the location unit 720 and other functional units in the second device 106. The second storage interface 748 can also be used for communication that is external to the second device 106.

The second storage interface 748 can receive information from the other functional units or from external sources, or can transmit information to the other functional units or to external destinations. The external sources and the external destinations refer to sources and destinations external to the second device 106.

The second storage interface 748 can include different implementations depending on which functional units or external units are being interfaced with the second storage unit 746. The second storage interface 748 can be implemented with technologies and techniques similar to the implementation of the second controller interface 744.

The second communication unit 736 can enable external communication to and from the second device 106. For example, the second communication unit 736 can permit the second device 106 to communicate with the first device 102 over the communication path 104.

The second communication unit 736 can also function as a communication hub allowing the second device 106 to function as part of the communication path 104 and not limited to be an end point or terminal unit to the communication path 104. The second communication unit 736 can include active and passive components, such as microelectronics or an antenna, for interaction with the communication path 104.

The second communication unit 736 can include a second communication interface 750. The second communication interface 750 can be used for communication between the second communication unit 736 and other functional units in the second device 106. The second communication interface 750 can receive information from the other functional units or can transmit information to the other functional units.

The second communication interface 750 can include different implementations depending on which functional units are being interfaced with the second communication unit 736. The second communication interface 750 can be implemented with technologies and techniques similar to the implementation of the second controller interface 744.

The first communication unit 716 can couple with the communication path 104 to send information to the second device 106 in the first device transmission 708. The second device 106 can receive information in the second communication unit 736 from the first device transmission 708 of the communication path 104.

The second communication unit 736 can couple with the communication path 104 to send information to the first device 102 in the second device transmission 710. The first device 102 can receive information in the first communication unit 716 from the second device transmission 710 of the communication path 104. The navigation system 100 can be executed by the first control unit 712, the second control unit 734, or a combination thereof.

A first capturing sensor 752 can capture the movement of the vehicle. For example, the first capturing sensor 752 can capture the vehicle changing lanes, progressing forward, or a combination thereof. For a specific example, the first capturing sensor 752 can be an accelerometer.

A second capturing sensor 754 can capture the movement of the vehicle. For example, the second capturing sensor 754 can capture the vehicle changing lanes, progressing forward, or a combination thereof. For a specific example, the second capturing sensor 754 can be an accelerometer.

For illustrative purposes, the second device 106 is shown with the partition having the second user interface 738, the second storage unit 746, the second control unit 734, and the second communication unit 736, although it is understood that the second device 106 can have a different partition. For example, the second software 742 can be partitioned differently such that some or all of its function can be in the second control unit 734 and the second communication unit 736. Also, the second device 106 can include other functional units not shown in FIG. 7 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 720, although it is understood that the second device 106 can also operate the location unit 720.

Figure 8:
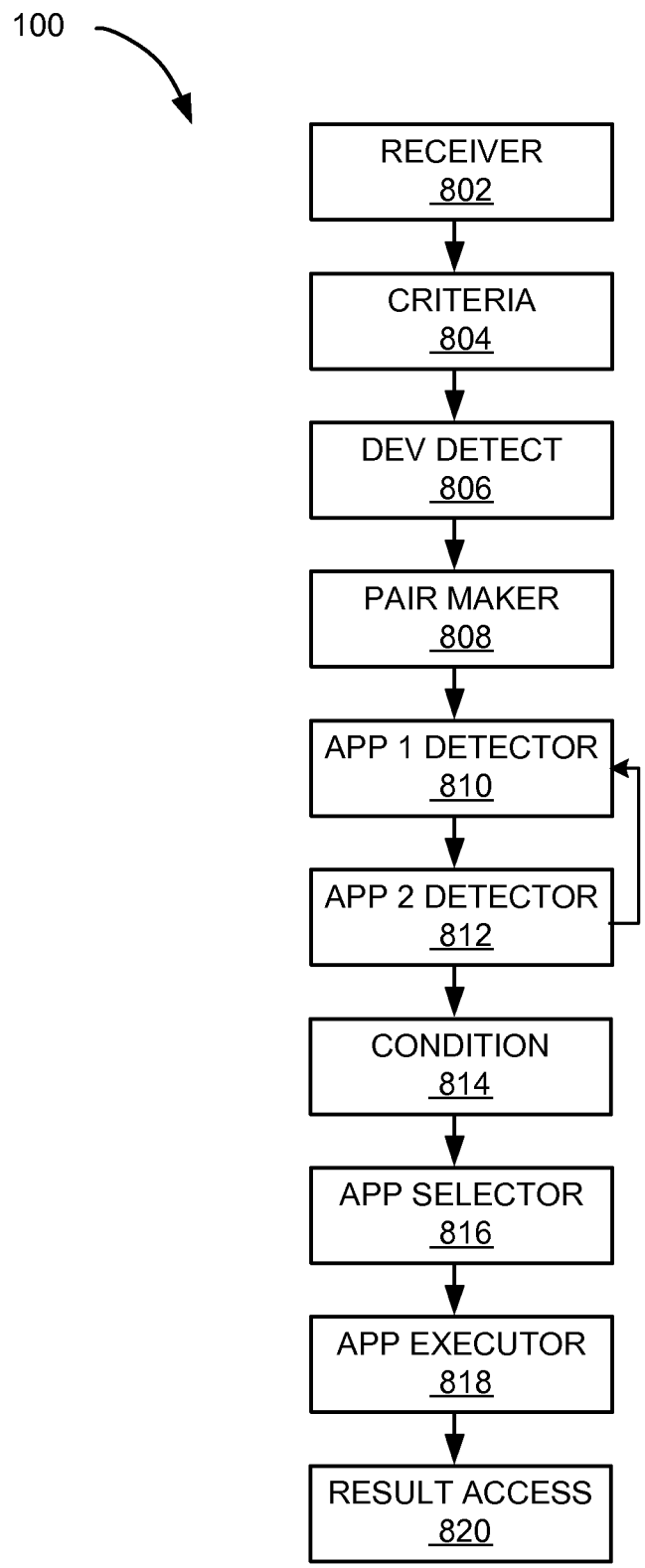
FIG. 8 is a control flow of the navigation system.

Referring now to FIG. 8, therein is shown a control flow of the navigation system 100. The navigation system 100 can include a receiver module 802. The receiver module 802 receives the input from the user of the navigation system 100, the navigation system 100, or a combination thereof.

For example, the receiver module 802 can receive the device selection 506 of FIG. 5, the service selection 504 of FIG. 5, the selection condition 216 of FIG. 5, or a combination thereof. For another example, the receiver module 802 can receive the command input 502 of FIG. 5 for interacting with the first pairing device 202 of FIG. 2 or the second pairing device 204 of FIG. 2. The receiver module 802 can receive the device selection 506, the service selection 504, the selection condition 216, the command input 502 via a manual input, an oral command, or a combination thereof.

The navigation system 100 can include a criteria module 804. The criteria module 804 sets the requirement for pairing the devices to access the execution result 214 of FIG. 2. For example, the criteria module 804 can set the pairing criteria 206 of FIG. 2.

The criteria module 804 can set the pairing criteria 206 in a number of ways. For example, the criteria module 804 can set the pairing criteria 206 as the candidate devices having fourth generation (4G) cellular wireless connectivity. For a specific example, the candidate devices can represent the first pairing device 202 and the second pairing device 204 both having 4G cellular wireless connectivity. For another example, the criteria module 804 can set the pairing criteria 206 as the first pairing device 202 within a ten meter radius from the second pairing device 204.

The navigation system 100 can include a device detector module 806. The device detector module 806 detects candidate devices for pairing. For example, the device detector module 806 can determine the first pairing device 202 and the second pairing device 204.

The device detector module 806 can determine the first pairing device 202 and the second pairing device 204 in a number of ways. For example, the device detector module 806 of the first pairing device 202 can determine the second pairing device 204 via the first communication unit 716 of FIG. 7.

For a more specific example, the device detector module 806 can determine whether the second pairing device 204 provides Bluetooth® connectivity for the communication path 104 of FIG. 1 to connect with the first pairing device 202. If the second pairing device 204 provides Bluetooth® connectivity, the device detector module 806 can determine the second pairing device 204 as a device available for pairing. The details for pairing will be discussed later.

For another example, the device detector module 806 of the second pairing device 204 can determine the first pairing device 202 via the second communication unit 736 of FIG. 7. For a more specific example, the device detector module 806 can determine whether the first pairing device 202 is within the ten meter radius from the second pairing device 204. More specifically, the device detector module 806 can determine the physical distance between the first pairing device 202 and the second pairing device 204 by calculating the distances between longitude and latitude of the first pairing device 202 and the second pairing device 204. If the first pairing device 202 is within the ten meter radius from the second pairing device 204, the device detector module 806 can determine the first pairing device 202 as a device available for pairing and can be communicated via the communication path 104. More specifically, continuing with the example, the first pairing device 202 will be unavailable if the first pairing device 202 is outside of the ten meter radius from the second pairing device 204.

The navigation system 100 can include a pair maker module 808. The pair maker module 808 couples the devices to access the execution result 214. For example, the pair maker module 808 can couple the first pairing device 202 and the second pairing device 204 based on meeting or exceeding the pairing criteria 206.

The pair maker module 808 can pair the first pairing device 202 and the second pairing device 204 in a number of ways. For example, the first pairing device 202 and the second pairing device 204 can be available for Bluetooth® connectivity. The pairing criteria 206 can represent having Bluetooth® connectivity as available. The pair maker module 808 can pair the first pairing device 202 and the second pairing device 204 via Bluetooth® connectivity.

For another example, the first pairing device 202 and the second pairing device 204 can be available on cellular wireless network. The pairing criteria 206 can be 4G cellular wireless connectivity. The pair maker module 808 can pair the first pairing device 202 and the second pairing device 204 via Worldwide Interoperability for Microwave Access (WiMAX)™.

The navigation system 100 can include an application one detector module 810. The application one detector module 810 detects the application available on the first pairing device 202. For example, the application one detector module 810 can determine the first application 210 of FIG. 2 for interacting with the first pairing device 202.

The application one detector module 810 can determine the first application 210 in a number of ways. For example, the application one detector module 810 can determine the first application 210 from the first software 726 of FIG. 7 via the first control interface 722 of FIG. 7. For another example, the application one detector module 810 can determine the first application 210 from the first control unit 712 of FIG. 7 via the first control interface 722.

For a further example, the application one detector module 810 can determine the service type 208 of FIG. 2 of the first application 210 for interacting with the first pairing device 202. More specifically, the first control interface 722 can receive information from the first software 726 for the service type 208 of the first application 210. The first control interface 722 can determine that the service type 208 of the first application 210 to be a navigation program by accessing the Application Programming Interface (API) of the first application to determine that the data structures, object classes and protocols of the first application 210 to be that of a navigation program.

For another example, the application one detector module 810 can determine the first application 210 for interacting with the first pairing device 202 in which the first application 210 is also of the service type 208 of the second application 212 of FIG. 2. More specifically, the application one detector module 810 can detect that the service type 208 of the first application 210 to be that of the service type 208 of the second application 212 by receiving the information from the second software 742 of FIG. 7 via the first communication unit 716 of FIG. 7 communicating with the second communication unit 736. For another example, the application one detector module 810 can determine the service type 208 of the first application 210 to be that of the service type 208 of the second application 212 by receiving the information from the second control unit 734 of FIG. 7 via the second controller interface 744 of FIG. 7. The second controller interface 744 can determine the service type 208 of the second application 212 by accessing the APIs of the second application 212.

The application one detector module 810 can compare the first application 210 and the second application 212 to determine that the service type 208 of the first application 210 and the second application 212 are both navigation programs. The detection of the service type 208 of the second application 212 will be discussed later.

For a different example, the application one detector module 810 can determine the service type 208 of the first application 210 as the unavailable application 302 of FIG. 3 on the second pairing device 204. As discussed previously, the application one detector module 810 can receive the information for the service type 208 of the second application 212 from the second software 742. The application one detector module 810 can determine the service type 208 of the first application 210 as not to be the same as the service type 208 of the second application 212 based on the information received. For example, the application one detector module 810 can determine the service type 208 to be the unavailable application 302 on the second pairing device 204 when none of the applications on the second pairing device 204 is a navigation program.

The navigation system 100 can include an application two detector module 812. The application two detector module 812 detects the application available on the second pairing device 204. For example, the application two detector module 812 can determine the second application 212 for interacting with the second pairing device 204.

The application two detector module 812 can determine the second application 212 similarly as to the application one detector module 810 determining the first application 210. For example, the application two detector module 812 can determine the service type 208 of the second application 212 for interacting with the second pairing device 204.

For a different example, the application two detector module 812 can determine the second application 212 for interacting with the second pairing device 204 in which the second application 212 is also of the service type 208 of the first application 210. For another example, the application two detector module 812 can determine the service type 208 of the second application 212 as the unavailable application 302 on the first pairing device 202.

The navigation system 100 can include a condition module 814. The condition module 814 sets the criteria to determine whether the result from running an application from one device should be selected over a result from running a similar application from another device. More specifically, selected over means a device will choose one application from one device and not select another application from another device.

For example, the condition module 814 can set the selection condition 216 of FIG. 2 for determining whether to select the second application 212 over the first application 210. For another example, the condition module 814 can set the selection condition 216 for determining whether to select the first application 210 over the second application 212.

The condition module 814 can set the selection condition 216 in a number of ways. For example, the condition module 814 can set the selection condition 216 based on the availability of the service type 208.

For a specific example, the condition module 814 can set the selection condition 216 to be the availability of the service type 208 representing navigation program on the first pairing device 202, the second pairing device 204, or a combination thereof. For another example, the condition module 814 can set the selection condition 216 to be the accuracy of the execution result 214 representing navigation information.

For example, the condition module 814 can set the default condition 220 of FIG. 2 as GPS based navigation program. However, the selection condition 216 entered by the user into the condition module 814 can be inertia based navigation program. The condition module 814 can update the default condition 220 to inertia based navigation program based on the selection condition 216 received from the user for selecting the first application 210 or the second application 212.

The navigation system 100 can include an application selector module 816. The application selector module 816 selects the application from one device over another device. For example, the application selector module 816 can select the second application 212 with the second application 212 meeting or exceeding the selection condition 216, otherwise the first application 210 is selected.

The application selector module 816 can select the first application 210, the second application 212, or a combination thereof in a number of ways. The application selector module 816 can determine whether the first application 210, the second application 212, or a combination thereof met or exceeded the selection condition 216.

For example, the selection condition 216 can be the availability of the service type 208 representing a navigation program. The application selector module 816 can determine that the first pairing device 202 may not have the service type 208 representing the navigation program by accessing the APIs available for the first pairing device 202 as discussed previously. The second application 212 for the second pairing device 204 can be selected if the application selector module 816 determines that the second application 212 is a navigation program by accessing the APIs available for the second pairing device 204.

The application selector module 816 can select the second application 212 with the second application 212 exceeds the selection condition 216 for offering the service type 208 on the first pairing device 202. For a specific example, the application selector module 816 for the first pairing device 202 can select the second application 212, because the second application 212 exceeds the selection condition 216 for offering the service type 208 representing a navigation program on the first pairing device 202.

More specifically, the selection condition 216 can be a minimum requirement for the navigation program to generate the execution result 214 that includes the travel route 222 of FIG. 2 to the target destination 226 of FIG. 2 without providing navigation information related to the traffic condition along the travel route 222. However, the second application 212 can generate the execution result 214 having the travel route 222 with the traffic condition information. Subsequently, the application selector module 816 can select the second application 212, because the execution result 214 for the second application 212 exceeded the selection condition 216.

For a different example, the first application 210 can represent the service type 208 of a navigation program. If the second pairing device 204 does not offer the service type 208 of a navigation program, the application selector module 816 of the second pairing device 204 can select the first application 210 with the first application 210 meeting or exceeding the selection condition 216 for offering the service type 208 on the second pairing device 204. Furthermore, the application selector module 816 can select the first application 210 with the first application 210 meeting or exceeding the selection condition 216, otherwise the second application 212 is selected.

For a different example, the application selector module 816 can select the first application 210 and the second application 212. The selection condition 216 can represent the availability of the navigation program. If the service type 208 of the first application 210 and the second application 212 represent a navigation program, the application selector module 816 can select both of the first application 210 and the second application 212, because the first application 210 and the second application 212 met the selection condition 216.

For another example, the application selector module 816 can select the first application 210 or the second application 212 based on the device selection 506 overriding the selection condition 216 for displaying on the first pairing device 202, the second pairing device 204, or a combination thereof. For a specific example, the device selection 506 made by the user can be the first pairing device 202.

The selection condition 216 can be an availability of a GPS based navigation program. As illustrated in FIG. 2, the execution result 214 generated by the second application 212 can be based on GPS based navigation program. However, if the user enters the device selection 506 representing the first pairing device 202, the application selector module 816 can select the first application 210, an inertia based navigation program. Subsequently, the execution result 214 can be generated by the first application 210 instead of the second application 212.

For another example, the application selector module 816 can select the first application 210 or the second application 212 based on the service selection 504 overriding the selection condition 216 for displaying on the first pairing device 202, the second pairing device 204, or a combination thereof. For example, the service selection 504 made by the user can be the first application 210.

As illustrated previously, even though the second application 212 can generate the execution result 214 based from the GPS based navigation program, the application selector module 816 can select the first application 210, the inertia based navigation program, based on the service selection 504. By the receiver module 802 receiving the command input 502 of FIG. 5 representing the device selection 506, the service selection 504, or a combination thereof, the user, the navigation system 100, or a combination thereof can control the first pairing device 202, the second pairing device 204, or a combination thereof. More specifically, the user, the navigation system 100, or a combination thereof can control the first pairing device 202, the second pairing device 204, or a combination thereof based on the command input 502 for displaying on the first pairing device 202, the second pairing device 204, or a combination thereof.

The navigation system 100 can include an application executor module 818. The application executor module 818 executes the application selected by the application selector module 816. For example, the application executor module 818 can execute the first application 210 or the second application 212 based on the first application 210 or the second application 212 meeting or exceeding the selection condition 216.

The application selector module 816 can execute the first application 210, the second application 212, or a combination thereof in a number of ways. For example, the application selector module 816 selected the second application 212 representing a GPS based navigation program. The application executor module 818 can execute the second application 212 for the second application 212 to generate the execution result 214 representing the travel route 222.

For another example, the application executor module 818 can execute the first application 210 and the second application 212 concurrently. For a specific example, the first pairing device 202 can be a smartphone that can run the first application 210 representing inertia based navigation program. The second pairing device 204 can run the second application 212 representing a GPS based navigation program in a vehicle.

Continuing with the example, the application executor module 818 can execute the first application 210 of the smartphone and the second application 212 of the in-vehicle GPS navigation system of a vehicle for accessing the both results of the execution result 214 from the first pairing device 202 and the second pairing device 204. Details regarding generating the execution result 214 will be discussed later.

The navigation system 100 can include a result access module 820. The result access module 820 accesses the result generated by the application from the device. For example, the result access module 820 can access the execution result 214 for executing the second application 212 for displaying on the first pairing device 202.

The result access module 820 can access the execution result 214 in a number of ways. For example, the result access module 820 can access the execution result 214 using Bluetooth® profiles and protocols. As a specific example, for some of the Bluetooth® transport profiles, the result access module 820 can access the execution result 214 via the Advanced Audio Distribution Profile (A2DP), the Basic Imaging Profile (BIP), the Audio/Video Distribution Transport Protocol (AVDTP), the Generic Audio/Video Distribution Profile (GAVDP), or a combination thereof. The result access module 820 can also access the execution result 214 using the Serial Port Profile (SPP), Object Exchange (OBEX), or a combination thereof.

For a specific example, the first pairing device 202 can represent a smartphone, which can execute the first application 210 representing an inertia based navigation program for generating the travel route 222. The second pairing device 204 can represent an in-vehicle GPS navigation system, which can execute the second application 212 representing a GPS based navigation program for generating the travel route 222.

The selection condition 216 can be the granularity of the execution result 214. The execution result 214 for the second application 212 can be more granular than the execution result 214 of the first application 210. Based on the execution result 214 of the second application 212 being more granular than the execution result 214 of the first application 210 and the second application 212 meeting the selection condition 216, the result access module 820 of the first pairing device 202 can access the execution result 214 of the second application 212 for displaying on the first pairing device 202. Similarly, the second pairing device 204 can access the execution result 214 for executing the first application 210 for displaying on the second pairing device 204.

For another example, the result access module 820 can access the execution result 214 for the first application 210 and the second application 212 for complementing the shortcoming 218 of FIG. 2 of each of the execution result 214 for displaying on the first pairing device 202, the second pairing device 204, or a combination thereof. As discussed previously, the first application 210 can represent an inertia based navigation program and the second application 212 can represent a GPS based navigation program.

An inertia based navigation program can generate navigation information based on local information. For example, the local information can include changing of the lane by vehicle and tracking forward progression by the acceleration of the vehicle. The inability to locate the vehicle within the geographic region initially can be the shortcoming 218 of the inertia based navigation program, because the inertia based navigation program may not be able to communicate with the GPS satellites.

In contrast, the GPS based navigation program can generate navigation information based on satellite information. For example, the GPS based navigation program can periodically communicate with the GPS satellites to locate the vehicle within a geographic area. The inability to provide navigation information between reception periods for communicating with the GPS satellite can be the shortcoming 218 for the GPS based navigation program.

The result access module 820 can access the execution result 214 of the first application 210 and the execution result 214 of the second application 212 to overcome the shortcoming 218. For example, the result access module 820 can access the execution result 214 from the second application 212 when starting the traversal along the travel route 222. For a further example, the result access module 820 can access the execution result 214 from the first application 210 when the navigation system 100 loses reception with the GPS satellites for tracking the movement of the navigation system 100 along the travel route 222.

For another example, the result access module 820 can access the execution result 214 of the first application 210 and the second application 212 in which the first application 210 and the second application 212 is running the same navigation program. However, the result access result module 820 can access the execution result 214 of a different component of the same navigation program.

More specifically, the first application 210 can generate the execution result 214 representing the travel route 222. The second application 212 can generate the execution result 214 representing the navigation information of traffic condition for the travel route 222.

The physical transformation from generating the execution result 214 results in movement in the physical world, such as people using the first pairing device 202, the second pairing device 204, the vehicle, or a combination thereof, based on the operation of the navigation system 100. As the movement in the physical world occurs, the movement itself creates additional information that is converted back to the execution result 214 for the continued operation of the navigation system 100 and to continue the movement in the physical world.

The first software 726 of FIG. 7 of the first device 102 of FIG. 7 can include the navigation system 100. For example, the first software 726 can include the receiver module, the criteria module 804, the device detector module 806, the pair maker module 808, the application one detector module 810, the application two detector module 812, the condition module 814, the application selector module 816, the application executor module 818, and the result access module 820.

The first control unit 712 of FIG. 7 can execute the first software 726 for the receiver module 802 to receive the command input 502. The first control unit 712 can execute the first software 726 for the criteria module 804 to set the pairing criteria 206. The first control unit 712 can execute the first software 726 for the device detector module 806 to detect the first pairing device 202, the second pairing device 204, or a combination thereof. The first control unit 712 can execute the first software 726 for the pair maker module 808 to pair the first pairing device 202 and the second pairing device 204.

The first control unit 712 can execute the first software 726 for the application one detector module 810 to detect the first application 210. The first control unit 712 can execute the first software 726 for the for the application two detector module 812 to detect the second application 212.

The first control unit 712 can execute the first software 726 for the condition module 814 for setting the selection condition 216. The first control unit 712 can execute the first software 726 for the application selector module 816 for selecting the first application 210, the second application 212, or a combination thereof.

The first control unit 712 can execute the first software 726 for the application executor module 818 for executing the first application 210, the second application 212, or a combination thereof. The first control unit 712 can execute the first software 726 for the result access module 820 for generating the execution result 214. The first control unit 712 can execute the first display interface 730 of FIG. 7 to display the execution result 214.

The second software 742 of FIG. 7 of the second device 106 of FIG. 7 can include the navigation system 100. For example, the second software 742 can include the receiver module, the criteria module 804, the device detector module 806, the pair maker module 808, the application one detector module 810, the application two detector module 812, the condition module 814, the application selector module 816, the application executor module 818, and the result access module 820.

The second control unit 734 of FIG. 7 can execute the second software 742 for the receiver module 802 to receive the command input 502. The second control unit 734 can execute the second software 742 for the criteria module 804 to set the pairing criteria 206. The second control unit 734 can execute the second software 742 for the device detector module 806 to detect the first pairing device 202, the second pairing device 204, or a combination thereof.

The second control unit 734 can execute the second software 742 for the pair maker module 808 to pair the first pairing device 202 and the second pairing device 204. The second control unit 734 can execute the second software 742 for the application one detector module 810 to detect the first application 210. The second control unit 734 can execute the second software 742 for the application two detector module 812 to detect the second application 212.

The second control unit 734 can execute the second software 742 for the condition module 814 for setting the selection condition 216. The second control unit 734 can execute the second software 742 for the application selector module 816 for selecting the first application 210, the second application 212, or a combination thereof. The second control unit 734 can execute the second software 742 for the application executor module 818 for executing the first application 210, the second application 212, or a combination thereof.

The second control unit 734 can execute the second software 742 for the result access module 820 for generating the execution result 214. The second control unit 734 can execute the second display interface 740 of FIG. 7 to display the execution result 214.

The navigation system 100 can be partitioned between the first software 726 and the second software 742. For example, the second software 742 can include the criteria module 804, the device detector module 806, the pair maker module 808, the application one detector module 810, the application two detector module 812, the condition module 814, the application selector module 816, and the application executor module 818. The second control unit 734 can execute modules partitioned on the second software 742 as previously described.

The first software 726 can include the receiver module and the result access module 820. Based on the size of the first storage unit 714, the first software 726 can include additional modules of the navigation system 100. The first control unit 712 can execute the modules partitioned on the first software 726 as previously described.

The first user interface 718 of FIG. 7 can receive the command input 502 by the user, the navigation system 100, or a combination thereof. The first control unit 712 can operate the first communication unit 716 to send the command input 502 to the second device 106. The first control unit 712 can operate the first software 726 to operate the location unit 720.

The second communication unit 736 of FIG. 7 can send the execution result 214 to the first device 102 through the communication path 104 of FIG. 7. The execution result can be displayed on the first display interface 730 and the second device 106.

It has been discovered that the present invention provides the navigation system 100 for a safer operation of the vehicle, the navigation system 100, and other user interface of the navigation system 100. By pairing the first pairing device 202 and the second pairing device 204, the user, the navigation system 100, or a combination thereof can access the execution result 214 generated by the first application 210, the second application 212, or a combination thereof. The ability to access the execution result 214 from first pairing device 202 and the second pairing device 204 can overcome the shortcoming 218 of the execution result 214 generated only from a single device. As a result, the accuracy of the execution result 214 can improve.

It has also been discovered that the present invention provides the navigation system 100 that provide improved battery life for consumer units, such as the first application 210 for example. The execution result 214 and the shared access to the execution result 214 give rise to the benefit by generating the execution result 214 generated by the second application 212 rather than generating the execution result 214 on the first application 210. The first pairing device 202 can go to low power mode and be awaken by the second pairing device 204 when the second pairing device 204 sends the command input 502 of FIG. 5 to the first pairing device 202. By sending the command input 502, the second pairing device 204 can activate the first pairing device 202 remotely.

The navigation system 100 describes the module functions or order as an example. The modules can be partitioned differently. The application one detector module 810 and the application two detector module 812 can be combined. Each of the modules can operate individually and independently of the other modules.

Furthermore, data generated in one module can be used by another module without being directly coupled to each other. For example, the application selector module 816 can receive the first application 210 from the application one detector module 810.

Figure 9:
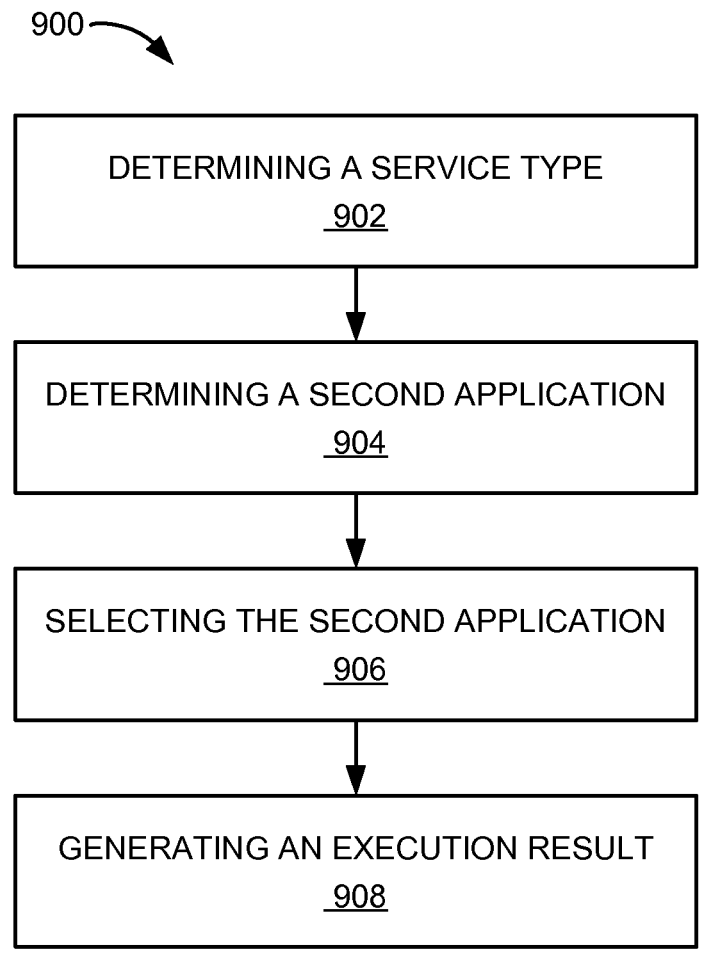
FIG. 9 is a flow chart of a method of operation of the navigation system in a further embodiment of the present invention.

Referring now to FIG. 9, therein is shown a flow chart of a method 900 of operation of the navigation system 100 in a further embodiment of the present invention. The method 900 includes: determining a service type of a first application for interacting with a first pairing device in a block 902; determining a second application for interacting with a second pairing device in which the second application is also of the service type in a block 904; selecting the second application with the second application meeting or exceeding a selection condition, otherwise the first application is selected in a block 906; and generating an execution result for executing the second application for displaying on the first pairing device in a block 908.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
    determining a service type of a first application for interacting with a first pairing device;
    determining a second application for interacting with a second pairing device;
    comparing the first application and the second application for determining the second application is also of the service type;
    selecting the second application over the first application with the second application meeting or exceeding a selection condition, otherwise the first application is selected; and
    generating an execution result based on executing the second application with a control unit for displaying the execution result on the first pairing device but prohibiting the execution result from being displayed on the second pairing device after the first pairing device accesses the execution result even though the second application was executed on the second pairing device.

2. The method as claimed in claim 1 further comprising:
    determining the first application for interacting with the first pairing device; and
    setting the selection condition for determining whether to select the second application over the first application.

3. The method as claimed in claim 1 further comprising:
    determining the service type of the first application as an unavailable application on the second pairing device; and
    selecting the first application with the first application meeting or exceeding the selection condition for offering the service type on the second pairing device.

4. The method as claimed in claim 1 further comprising:
    determining the service type of the second application as an unavailable application on the first pairing device; and
    selecting the second application with the second application meeting or exceeding the selection condition for offering the service type on the first pairing device.

5. The method as claimed in claim 1 further comprising:
    determining the selection condition of a service type for the first pairing device and the second pairing device; and
    selecting the first application or the second application based on the first application or the second application meeting or exceeding the selection condition.

6. The method as claimed in claim 1 further comprising:
    setting a pairing criteria for pairing the first pairing device and the second pairing device based on meeting or exceeding the pairing criteria; and
    executing the first application or the second application based on the first application or the second application meeting or exceeding the selection condition.

7. The method as claimed in claim 1 further comprising:
    executing the first application and the second application concurrently; and
    generating the execution results for the first application and the second application for complementing a shortcoming of each of the execution results for displaying on the first pairing device, the second pairing device, or a combination thereof.

8. A method of operation of a navigation system comprising:
    determining a service type of a first application for interacting with a first pairing device;
    determining a second application for interacting with a second pairing device;
    comparing the first application and the second application for determining the second application is also of the service type;
    setting a selection condition for determining whether to select the second application over the first application;
    selecting the second application over the first application with the second application meeting or exceeding the selection condition, otherwise the first application is selected; and
    generating an execution result based on executing the second application with a control unit for displaying the execution result on the first pairing device but prohibiting the execution result from being displayed on the second pairing device after the first pairing device accesses the execution result even though the second application was executed on the second pairing device.

9. The method as claimed in claim 8 further comprising:
    determining the service type of the second application for interacting with the second pairing device;

determining the first application for interacting with the first pairing device in which the first application is also of the service type of the second application;
setting the selection condition for determining whether to select the first application over the second application;
selecting the first application with the first application meeting or exceeding the selection condition, otherwise the second application is selected; and
generating the execution result for executing the first application for displaying on the second pairing device.

10. The method as claimed in claim 8 further comprising:
receiving a device selection; and
selecting the first application or the second application based on the device selection overriding the selection condition for displaying on the first pairing device, the second pairing device, or a combination thereof.

11. The method as claimed in claim 8 further comprising:
receiving a service selection; and
selecting the first application or the second application based on the service selection overriding the selection condition for displaying on the first pairing device, the second pairing device, or a combination thereof.

12. The method as claimed in claim 8 further comprising:
setting a default condition for selecting the first application or the second application;
receiving the selection condition; and
updating the default condition based on the selection condition received for selecting the first application or the second application.

13. The method as claimed in claim 8 further comprising:
receiving a command input for interacting with the first pairing device; and
controlling the second pairing device based on the command input for displaying on the first pairing device, the second pairing device, or a combination thereof.

14. The method as claimed in claim 8 further comprising:
receiving a command input for interacting with the second pairing device; and
controlling the first pairing device based on the command input for displaying on the first pairing device, the second pairing device, or a combination thereof.

15. A navigation system comprising:
a memory unit comprising software instructions;
a control unit for executing the software instructions, the software instructions, when executed by the control unit, to:
determine a service type of a first application for interacting with a first pairing device,
determine a second application for interacting with a second pairing device,
compare the first application and the second application to determine the second application is also of the service type,
select the second application over the first application with the second application meeting or exceeding a selection condition, otherwise the first application is selected,
generate an execution result based on executing the second application, and
a communication interface, coupled to the control unit, to send the execution result for displaying the execution result on the first pairing device but prohibiting the execution result from being displayed on the second pairing device after the first pairing device accesses the execution result even though the second application was executed on the second pairing device.

16. The system as claimed in claim 15 wherein the control unit is for executing the software instructions to:
determine the first application for interacting with the first pairing device; and
set the selection condition for determining whether to select the second application over the first application.

17. The system as claimed in claim 15 wherein the control unit is for executing the software instructions to:
determine the service type of the first application as an unavailable application on the second pairing device; and
select the first application with the first application meeting or exceeding the selection condition for offering the service type on the second pairing device.

18. The system as claimed in claim 15 wherein the control unit is for executing the software instructions to:
determine the service type of the second application as an unavailable application on the first pairing device; and
select the second application with the second application meeting or exceeding the selection condition for offering the service type on the first pairing device.

19. The system as claimed in claim 15 wherein the control unit is for executing the software instructions to:
determine the first pairing device and the second pairing device;
pair the first pairing device and the second pairing device; and
select the first application or the second application based on the first application or the second application meeting or exceeding the selection condition.

20. The system as claimed in claim 15 wherein the control unit is for executing the software instructions to:
set a pairing criteria;
pair the first pairing device and the second pairing device based on meeting or exceeding the pairing criteria; and
execute the first application or the second application based on the first application or the second application meeting or exceeding the selection condition.

21. The system as claimed in claim 15 wherein the control unit is for executing the software instructions to:
execute the first application and the second application concurrently; and
generate the execution results for the first application and the second application for complementing a shortcoming of each of the execution results for displaying on the first pairing device, the second pairing device, or a combination thereof.

22. The system as claimed in claim 15 wherein the control unit is for executing the software instructions to set a selection condition for determining whether to select the second application over the first application.

23. The system as claimed in claim 22 wherein the control unit is for executing the software instructions to:
determine the service type of the second application for interacting with the second pairing device;
determine the first application for interacting with the first pairing device in which the first application is also of the service type of the second application;
set the selection condition for determining whether to select the first application over the second application;
select the first application with the first application meeting or exceeding the selection condition, otherwise the second application is selected; and
generate the execution result for executing the first application for displaying on the second pairing device.

24. The system as claimed in claim 22 wherein the control unit is for executing the software instructions to:

receive a device selection; and select the first application or the second application based on the device selection overriding the selection condition for displaying on the first pairing device, the second pairing device, or a combination thereof.

25. The system as claimed in claim 22 wherein the control unit is for executing the software instructions to:

receive a service selection; and select the first application or the second application based on the service selection overriding the selection condition for displaying on the first pairing device, the second pairing device, or a combination thereof.

26. The system as claimed in claim 22 wherein the control unit is for executing the software instructions to:

select the first application or the second application; a receiver module, coupled to the criteria module, for receiving a selection condition; and update the default condition based on the selection condition received for selecting the first application or the second application.

27. The system as claimed in claim 22 wherein the control unit is for executing the software instructions to:

receive a command input for interacting with the first pairing device; and control the second pairing device based on the command input for displaying on the first pairing device, the second pairing device, or a combination thereof.

28. The system as claimed in claim 22 wherein the control unit is for executing the software instructions to:

receive a command input for interacting with the second pairing device; and control the first pairing device based on the command input for displaying on the first pairing device, the second pairing device, or a combination thereof.

* * * * *